(12) United States Patent
Yamagishi et al.

(10) Patent No.: US 10,139,247 B2
(45) Date of Patent: Nov. 27, 2018

(54) POSITION DETECTING DEVICE

(71) Applicant: SMC Corporation, Chiyoda-ku (JP)

(72) Inventors: Takeshi Yamagishi, Tsukubamirai (JP); Tomohiko Aki, Nagareyama (JP); Norimasa Ozaki, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 35 days.

(21) Appl. No.: 15/378,565

(22) Filed: Dec. 14, 2016

(65) Prior Publication Data

US 2017/0176215 A1 Jun. 22, 2017

(30) Foreign Application Priority Data

Dec. 16, 2015 (JP) .................................. 2015-244752

(51) Int. Cl.
*G01D 5/14* (2006.01)
(52) U.S. Cl.
CPC .................................. *G01D 5/145* (2013.01)
(58) Field of Classification Search
CPC ............ G01D 5/147; G01B 7/30; G01P 3/487
See application file for complete search history.

(56) References Cited

U.S. PATENT DOCUMENTS 6,722,261 B1 * 4/2004 Brown ................. F15B 15/2869
324/642
2003/0030431 A1 * 2/2003 Reininger ........... F15B 15/2807
324/207.2
2004/0122536 A1 * 6/2004 Saitou ....................... F15B 9/09
700/70
2005/0078895 A1 * 4/2005 Kanbe ................... F02F 7/0053
384/432
2005/0212513 A1 * 9/2005 Yamashita ........... G01D 5/2451
324/207.25

(Continued)

FOREIGN PATENT DOCUMENTS

EP 2166313 * 3/2010
EP 2 166 313 B1 11/2011

(Continued)

OTHER PUBLICATIONS

Korean Office Action dated Jun. 23, 2017 in Korean Patent Application No. 10-2016-0172731 (with partial English translation).

(Continued)

*Primary Examiner* — Thang Le
*Assistant Examiner* — Alvaro Fortich
(74) *Attorney, Agent, or Firm* — Oblon, McClelland, Maier & Neustadt, L.L.P.

(57) ABSTRACT

A number n of Hall elements of a position detecting device output analog detection signals responsive to magnetism from a magnet of a piston. A number n of AD converters carry out analog to digital conversion to convert the analog detection signals into digital detection signals. A ladder circuit receives, as an n-bit digital signal, the digital detection signals output from a number n of magnetic detectors, and performs digital to analog conversion thereof into a single analog output signal. A control IC detects an approximate position of the piston on the basis of the single analog output signal that is input thereto.

6 Claims, 5 Drawing Sheets

(56) References Cited

U.S. PATENT DOCUMENTS

| | | | | |
|---|---|---|---|---|
| 2007/0016333 A1* | 1/2007 | Edwards | ............. | G05D 7/0635 |
| | | | | 700/282 |
| 2007/0145970 A1 | 6/2007 | Takahashi | | |
| 2010/0026083 A1* | 2/2010 | Leiber | .................... | B60T 7/042 |
| | | | | 303/3 |
| 2015/0289073 A1* | 10/2015 | Salvia | ................. | H04R 29/004 |
| | | | | 381/58 |
| 2016/0041005 A1 | 2/2016 | Shimizu et al. | | |

FOREIGN PATENT DOCUMENTS

| | | | |
|---|---|---|---|
| JP | 2003-217064 | | 7/2003 |
| JP | 2006-072679 | * | 3/2006 |
| JP | 2006-72679 A | | 3/2006 |
| JP | 2007-178158 | | 7/2007 |
| JP | 2010-071988 | | 4/2010 |
| JP | 2011-013014 | | 1/2011 |
| JP | 2014-178283 | | 9/2014 |
| TW | M495504 U | | 2/2015 |

OTHER PUBLICATIONS

Combined Office Action and Search Report dated Dec. 7, 2017 in Taiwanese Patent Application No. 105141596 (with partial English translation), 7 pages.

Japanese Office Action dated Jul. 10, 2018 in Japanese Patent Application No. 2015-244752 w/English translation; 68 pages.

* cited by examiner

POSITION DETECTING DEVICE

CROSS-REFERENCE TO RELATED APPLICATION

This application is based upon and claims the benefit of priority from Japanese Patent Application No. 2015-244752 filed on Dec. 16, 2015, the contents of which are incorporated herein by reference.

BACKGROUND OF THE INVENTION

Field of the Invention

The present invention relates to a position detecting device for detecting the position of a moving body, by detecting magnetism from a magnet that is attached to the moving body.

Description of the Related Art

In general, as a position detecting device that measures the position of a driven portion (moving body) of an actuator such as a pneumatic cylinder or the like, a magnetic detecting switch, and a laser displacement meter, etc., have been known. A magnetic detecting switch can be manufactured at low cost. On the other hand, such a magnetic detecting switch can only determine whether or not a moving body on which a magnet is mounted as an object to be detected resides at a specified position. A laser displacement meter is capable of measuring the position of the moving body, however, in addition to needing to be installed separately from the actuator, a location must be secured in advance for irradiating laser light onto the moving body. In contrast thereto, with a position detecting device such as a magnetic length measuring sensor, the position of a moving body can easily be detected, together with enabling the device to be mounted directly on an actuator.

In Japanese Laid-Open Patent Publication No. 2007-178158, a magnetic length measuring sensor is disclosed, which reads sequentially the outputs from magnetic sensors arranged in a row, and detects the position of a magnet, which is a moving body, on the basis of the respective read outputs.

SUMMARY OF THE INVENTION

However, with the technique disclosed in Japanese Laid-Open Patent Publication No. 2007-178158, since outputs from a large number of magnetic sensors are read sequentially, processing time corresponding to the number of magnetic sensors is required, and responsiveness is poor.

Thus, it may be considered to provide wiring to each of the magnetic sensors, and to read collectively the outputs of the respective magnetic sensors. In this case, since wiring must be provided corresponding to the number of magnetic sensors, a routing space for each of such wirings is required, thus leading to a problem in that the size and cost of the apparatus increases.

The present invention has been made with the aim of resolving the aforementioned problem, and has the object of providing a position detecting device, which is capable of improving responsiveness by rapidly detecting the position of a moving body on which a magnet is mounted, and which can realize a reduction in the size and cost of the device.

A position detecting device according to the present invention includes a number n of magnetic detectors, a DA converter, and a position detecting unit.

Each of the number n of magnetic detectors has a magnetic sensor element configured to detect magnetism from a magnet mounted on a moving body and output an analog detection signal responsive to the magnetism, and a first AD converter configured to perform AD conversion of the analog detection signal into a digital detection signal and output the digital detection signal. In addition, the n magnetic detectors are disposed at regular intervals along a movement direction of the moving body.

The DA converter receives, as an n-bit digital signal, the digital detection signals output respectively from the n magnetic detectors, performs DA conversion on the n-bit digital signal, and outputs a DA converted analog output signal.

The position detecting unit detects a position of the moving body on the basis of the analog output signal input thereto from the DA converter.

Consequently, in the present invention, after having received, as an n-bit digital signal, the digital detection signals output respectively from the n magnetic detectors, the DA converter performs DA conversion to convert the n-bit digital signal into the analog output signal, and outputs the same to the position detecting unit. As a result, the position detecting unit does not need to sequentially read out the number n of analog detection signals or digital detection signals, and therefore, based only on the analog output signal, the position detecting unit can detect the position of the moving body rapidly.

Further, when the moving body comes into proximity to the number n of magnetic sensor elements, the magnetic sensor elements react to (i.e., detect) the magnetism from the magnet and output high level analog detection signals, whereas when the moving body becomes distanced therefrom and such magnetism cannot be detected, the magnetic sensor elements output low level analog detection signals. Consequently, from a relationship between the value of the analog output signal responsive to the n-bit digital signal (based on the n analog detection signals), and the positions at which the n magnetic sensor elements are arranged, the position detecting unit can easily detect the position of the magnet (i.e., the position of the moving body on which the magnet is mounted).

Furthermore, since the position detecting unit reads out only the analog detection signal from the DA converter, the number of wirings between the position detecting unit and the DA converter can be reduced. Accordingly, with the position detecting device, it is possible to detect the position of the moving body with a minimum required amount of wiring. As a result, an increase in size and scale of the position detecting device can be avoided, and costs can be reduced.

Consequently, according to the present invention, the position detecting device is capable of improving responsiveness by rapidly detecting the position of the moving body on which the magnet is mounted, and a reduction in size and cost of the position detecting device can be realized.

In this instance, the position detecting unit includes a second AD converter configured to perform AD conversion on the analog output signal input thereto, and the position detecting unit specifies a position of the magnet on the basis of an AD converted n-bit digital output signal, whereby the position of the moving body on which the magnet is mounted is detected.

The n-bit digital output signal is a digital signal that corresponds to the digital detection signals output to the DA converter from the number n of magnetic detectors. Consequently, from a relationship between the value of the n-bit digital output signal and the positions at which the n magnetic sensor elements are arranged, the position detecting unit can quickly identify the position of the magnet, and can easily detect the position of the moving body on which the magnet is mounted.

Incidentally, the magnetism from the magnet has a certain extent or spread. Therefore, the position of the moving body, which is detected by the position detecting unit on the basis of the n-bit digital output signal, is possibly an approximate position corresponding to such an extent or spread of the magnetism.

Thus, in order to specify in detail the position of the moving body, the present invention preferably is equipped with the following configuration. More specifically, the position detecting device further includes a signal line configured to connect the n magnetic detectors and the position detecting unit. The position detecting unit specifies a plurality of magnetic detectors that lie within a predetermined range with respect to the detected position of the moving body, reads out values of the analog detection signals from the specified plurality of magnetic detectors through the signal line, and identifies a detailed position of the moving body on the basis of the values of the plurality of analog detection signals that were read out.

In accordance with this feature, based on the approximate position of the moving body identified using the n-bit digital output signal, the position detecting unit reads out values of the analog detection signals from the plurality of magnetic detectors that lie within the predetermined range. More specifically, since there is no need for the position detecting unit to read out the values of the analog detection signals from all of the magnetic detectors, the processing time required to identify the detailed position of the moving body can be shortened. Consequently, with the present invention, the process to specify the detailed position of the moving body can be performed highly rapidly, and responsiveness can further be enhanced.

Further, the position detecting unit preferably plots the values of the plurality of analog detection signals that are read out from the specified plurality of magnetic detectors, with respect to the positions at which the specified plurality of magnetic detectors are arranged, thereby determines a waveform showing a change of the values of the plurality of analog detection signals with respect to the movement direction, and preferably detects a zero-crossing point where the determined waveform crosses a zero line, thereby identifying the position of the detected zero-crossing point as the detailed position of the moving body.

In accordance with this feature, it is possible to specify the detailed position of the moving body quickly and reliably.

Furthermore, the position detecting unit may calculate a movement velocity and/or a movement distance of the moving body on the basis of the identified detailed position of the moving body.

Moreover, in the present invention, the DA converter preferably is an R-2R type of ladder circuit.

Further, in the present invention, the n magnetic sensor elements are Hall elements, the moving body is a piston configured to move along the movement direction in the interior of a cylinder tube of an actuator, the magnet is mounted on the piston with the magnetic poles thereof oriented along the movement direction, and the n magnetic detectors are disposed in a row along the movement direction on an outer side of the cylinder tube.

In accordance with this feature, simply by applying the position detecting device to the actuator and arranging the n magnetic detectors in a row on the outer side of the cylinder tube, the detailed position of the piston on which the magnet is mounted can be specified quickly and reliably.

Further, by arranging the n magnetic detectors in a row on the outer side of the cylinder tube, widening in the widthwise direction (the outer peripheral direction of the cylinder tube) can be suppressed. As a result, when the n magnetic detectors are mounted in a row on a rectangular printed circuit board elongated along the longitudinal direction of the cylinder tube, and the printed circuit board is disposed on the cylinder tube (for example, when arranged by embedding the printed circuit board in a groove provided in the longitudinal direction of the cylinder tube), the number of wires of the printed circuit board can be reduced, together with realizing a reduction in the space occupied in the widthwise direction. Consequently, according to the present invention, in the case that the position detecting device is applied to an actuator, in comparison with the conventional technique, an advantage is achieved in terms of the footprint (installation area) and cost thereof.

The above and other objects, features and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Below, a preferred embodiment of a position detecting device according to the present invention will be described in detail with reference to the accompanying drawings.

[Outline Configuration of Actuator and Position Detecting Device]

Figure 1:
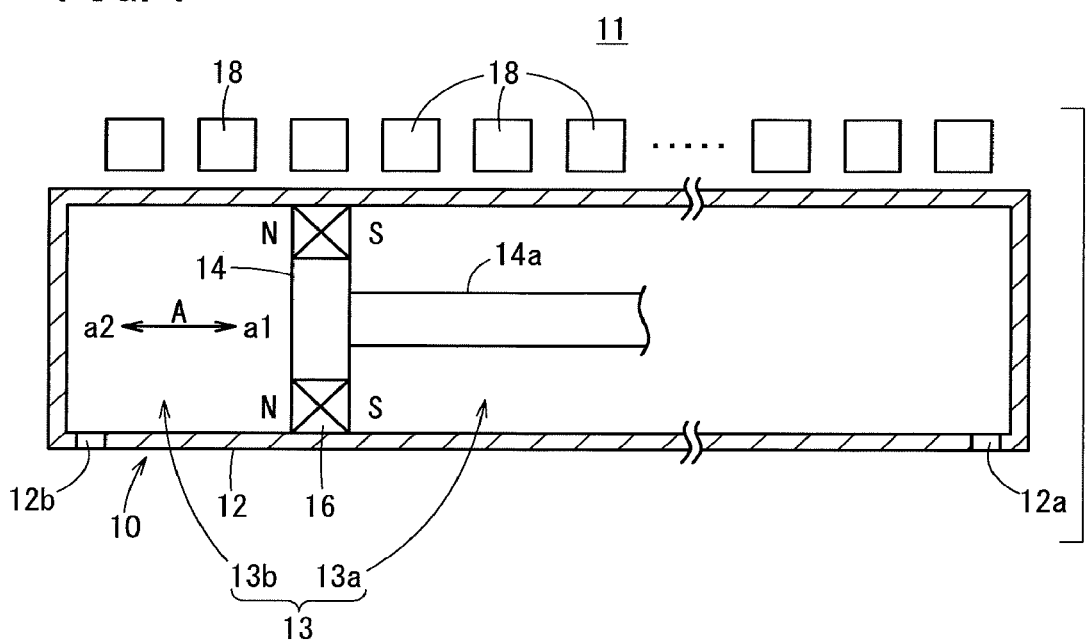
FIG. 1 is a cross-sectional view showing in outline the configuration of an actuator to which a position detecting device according to a present embodiment is applied.

FIG. 1 is a cross-sectional view showing in outline the configuration of an actuator 10 to which a position detecting device 11 according to the present embodiment is applied.

The actuator 10 includes a cylinder tube 12 and a piston 14 (moving body). The piston 14 partitions a space 13 in the interior of the cylinder tube 12 into two spaces 13a, 13b, and is moved in the directions of the arrow A (movement direction) in the interior of the cylinder tube 12. A piston rod 14a is connected to the piston 14. In FIG. 1, a righthand direction among the directions of the arrow A is defined by the direction of the arrow a1, and a lefthand direction among the directions of the arrow A is defined by the direction of the arrow a2.

On both ends of the cylinder tube 12 in the directions of the arrow A, respective air ports 12a, 12b are disposed for the purpose of allowing air to flow into the spaces 13a, 13b, together with discharging air from the interior of the spaces 13a, 13b. In this case, when air is allowed to flow in from the air port 12b, and air is discharged from the air port 12a, the piston 14 is moved in the direction of the arrow a1 due to an air pressure difference between the two spaces 13a, 13b. Conversely, when air is allowed to flow in from the air port 12a, and air is discharged from the air port 12b, the piston 14 is moved in the direction of the arrow a2 due to the air pressure difference between the two spaces 13a, 13b.

A magnet 16 is disposed on the piston 14. The position detecting device 11 according to the present embodiment is a magnetic length measuring sensor that detects magnetism from the magnet 16, and based on the detected magnetism, detects the position of the piston 14 on which the magnet 16 is mounted. More specifically, on the outer side of the cylinder tube 12 of the actuator 10, a plurality of (a number n of) magnetic detectors 18 that constitute the position detecting device 11 are disposed in a row separated at regular intervals along the movement direction (directions of the arrow A) of the piston 14. With the position detecting device 11, the position of the piston 14 can be specified on the basis of detection signals from the plurality of magnetic detectors 18.

One side of the magnet 16 in the directions of the arrow A is an N-pole, and the other side thereof is an S-pole. In this instance, the side of the magnet 16 in the direction of the arrow a2 is the N-pole, whereas the side thereof in the direction of the arrow a1 is the S-pole. Accordingly, the orientation of the magnetic poles of the magnet 16 is in the same direction as the movement direction (directions of the arrow A) of the piston 14. Further, in the present embodiment, preferably a non-illustrated groove is provided in the cylinder tube 12 along the longitudinal direction (directions of the arrow A) thereof, and the n magnetic detectors 18 are arranged in a row on a rectangular printed circuit board, which is embedded and arranged in the groove.

[Detailed Configuration and Operations of the Position Detecting Device]

Next, concerning the detailed configuration of the position detecting device 11 according to the present embodiment, a description thereof will be given with reference to the schematic block diagram of FIG. 2.

The position detecting device 11 which serves as a magnetic length measuring sensor is equipped with a number n of magnetic detectors 18, a ladder circuit 20 (DA converter), and a control IC 22 (position detecting unit). Each of the magnetic detectors 18 includes one microcomputer 26 and one Hall element 24 (magnetic sensor element). Stated otherwise, each of the magnetic detectors 18 is in the form of a module in which one Hall element 24 and one microcomputer 26 are combined. A driving potential VCC and a reference potential GND are imposed on the Hall element 24 of each of the n magnetic detectors 18.

The Hall elements 24 detect magnetism from the magnet 16, and output, to the microcomputers 26, analog detection signals (hereinafter referred to as analog detection signals) responsive to the detected magnetism. In this case, the Hall elements 24 output analog detection signals (vertical component analog signals), which correspond to a vertical component of magnetism that is perpendicular to the movement direction (orientation of the magnetic poles of the magnet 16) of the piston 14.

Figure 3:
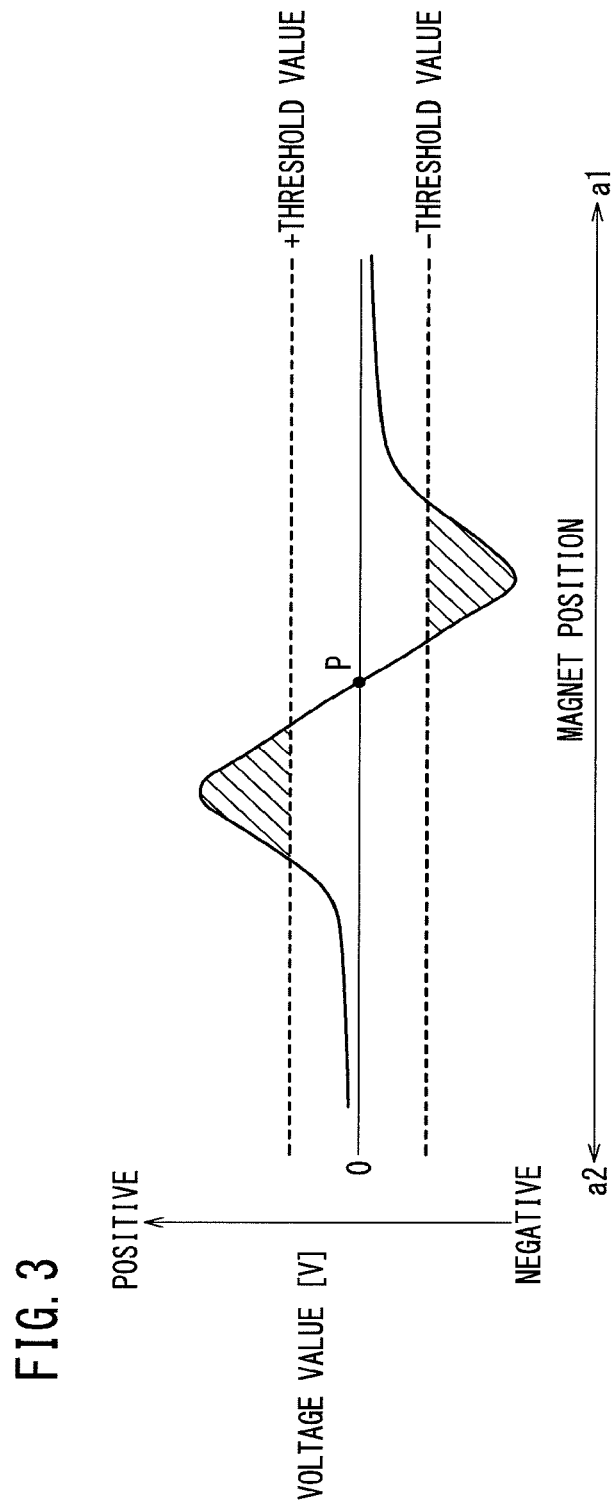
FIG. 3 is a view showing an analog detection signal (vertical component analog signal) waveform detected by one Hall element.

FIG. 3 is a view showing an analog detection signal (vertical component analog signal) waveform detected by one Hall element 24. In this instance, the position of the magnet 16 is indicated on the horizontal axis in FIG. 3, and the value (voltage value) of the analog detection signal is indicated on the vertical axis.

When the N-pole of the magnet 16 comes into proximity to the Hall element 24, the value of the analog detection signal becomes positive, and when the N-pole arrives nearest thereto, the value of the analog detection signal becomes highest. Conversely, when the S-pole of the magnet 16 comes into proximity to the Hall element 24, the value of the analog detection signal becomes negative, and when the S-pole arrives nearest thereto, the value of the analog detection signal becomes lowest. In a state in which the boundary between the N-pole and the S-pole of the magnet 16 is nearest to the Hall element 24, the value of the analog detection signal becomes 0 [V].

Figure 2:
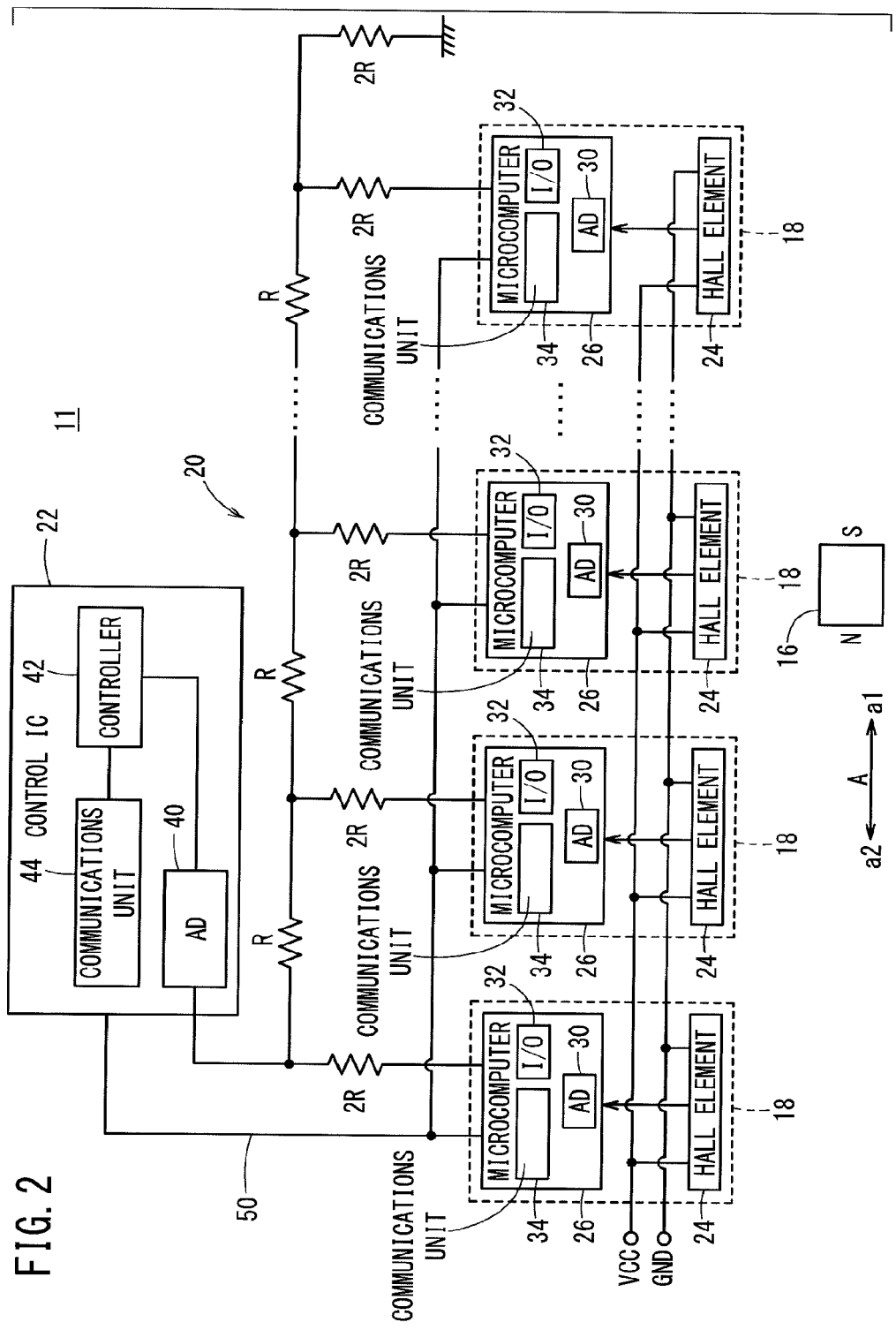
FIG. 2 is a schematic block diagram of the position detecting device of FIG. 1.

For example, in the arrangement shown in FIG. 2, in the case that attention is focused on the second magnetic detector 18 from the left (the second counting from the side in the direction of the arrow a2), when the magnet 16 comes into proximity to the Hall element 24 of the second magnetic detector 18 at a constant speed traveling from the direction of the arrow a1 toward the direction of the arrow a2 (the direction on the side of the N-pole), the value of the analog detection signal gradually increases from 0 [V], and after having arrived at its positive peak value, gradually decreases and thereafter returns to a value of 0 [V]. In addition, as the magnet 16 moves further in the direction of the arrow a2, the value of the analog detection signal further becomes lower, and after having reached its negative peak value, gradually increases and thereafter returns to a value of 0 [V].

On the other hand, in the arrangement shown in FIG. 2, for example, in the case that attention is focused on the magnetic detector 18 on the rightmost side (the side in the direction of the arrow a1), when the magnet 16 comes into proximity to the rightmost-side Hall element 24 of the magnetic detector 18 at a constant speed traveling from the direction of the arrow a2 toward the direction of the arrow a1 (the direction on the side of the S-pole), the value of the analog detection signal gradually decreases from 0 [V], and after having arrived at its negative peak value, gradually increases and thereafter returns to a value of 0 [V]. In addition, as the magnet 16 moves further in the direction of the arrow a1, the value of the analog detection signal further becomes higher, and after having reached its positive peak value, gradually decreases and thereafter returns to a value of 0 [V].

In this instance, in the waveform shown in FIG. 3, the point at which the analog detection signal intersects (crosses) the 0 [V] line is referred to as a zero-crossing point P.

Returning to FIG. 2, each of the microcomputers 26 includes at least an AD converter 30 (first AD converter), an I/O port 32, and a communications unit 34. The AD converter 30 converts the analog detection signal detected at a constant period by the Hall element 24 into a 1-bit digital signal (hereinafter referred to as a "digital detection signal"), and outputs the same to the I/O port 32.

More specifically, if the absolute value of the analog detection signal detected by the Hall element 24 is higher than a threshold value, the AD converter 30 outputs a digital detection signal of "1" to the I/O port 32, while on the other hand, if the absolute value of the analog detection signal is lower than the threshold value, the AD converter 30 outputs a digital detection signal of "0" to the I/O port 32. In FIG. 3, regions of the analog detection signal which is converted into a digital detection signal of "1" by the AD converter 30 are shown in hatching.

The I/O port 32 outputs the 1-bit digital detection signal that is sent thereto from the AD converter 30, to the ladder circuit 20. Accordingly, 1-bit digital detection signals are input to the ladder circuit 20 from the respective n magnetic detectors 18. Therefore, the ladder circuit 20 receives, as a digital signal (n-bit digital signal) having a bit number corresponding to the number n of magnetic detectors 18, the digital detection signals output from the respective n magnetic detectors 18. For example, if the number of the magnetic detectors 18 is eight, 1-bit digital detection signals from the eight magnetic detectors 18 are output to the ladder circuit 20, and therefore, an 8-bit digital signal is input to the ladder circuit 20.

Figure 4:
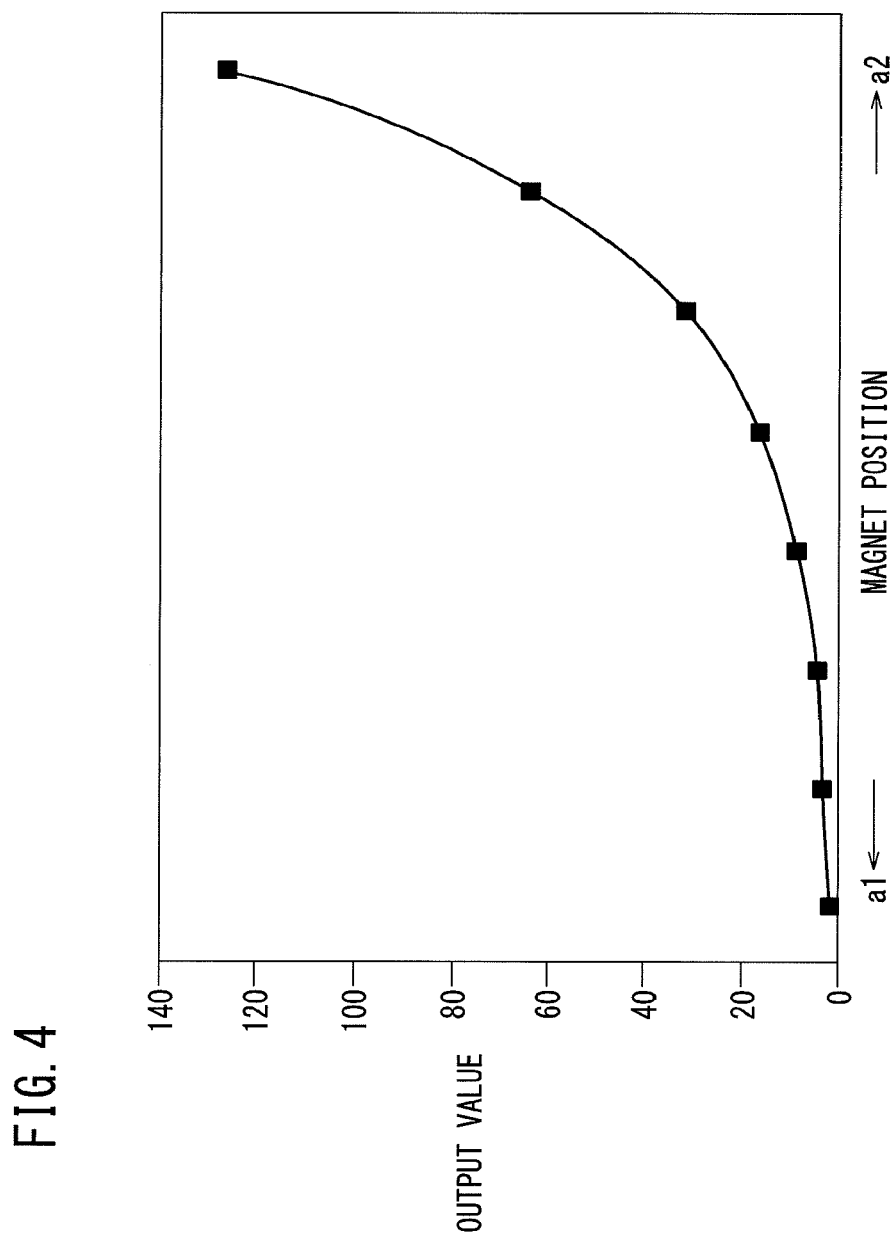
FIG. 4 is a graph showing a relationship between an 8-bit digital signal input to a ladder circuit, and an approximate position of a piston, in the case that the number of magnetic detectors is eight.

The number n of magnetic detectors 18 can be modified arbitrarily depending on the measurement distance or the like. The 1-bit digital detection signals output from the n magnetic detectors 18 shown in FIG. 2 correspond respectively to a first digit, a second digit, . . . , an nth digit of the n-bit digital signal in order from the rightmost magnetic detector 18 along the directions of the arrow A. The n-bit digital signal indicates the position (approximate position) of the piston 14 (magnet 16). FIG. 4 is a graph showing a relationship between an 8-bit digital signal input to the ladder circuit 20, and the position (approximate position) of the piston 14 (magnet 16), in the case that the number of the magnetic detectors 18 is eight. In FIG. 4, an 8-bit digital signal value (output value), which is input to the ladder circuit 20, is shown in decimal notation.

Incidentally, the magnetism from the magnet 16 possesses a constant extent or spread. Therefore, there are a plurality of magnetic detectors 18 that output a digital detection signal of "1". Further, the digital detection signals that are output by the magnetic detectors 18 positioned in the vicinity of the zero-crossing point P become "0" (see FIG. 3). Consequently, a data string of the digital detection signals output respectively from the plural magnetic detectors 18 (for example, assuming there are six individual magnetic detectors 18) that lie within a predetermined range from the position of the piston 14 (magnet 16) become, for example, "110011" in the direction of the arrow a1. Therefore, if a graph such as that shown in FIG. 4 is used, it is possible to specify the position of the magnet 16 from the n-bit digital signal. However, it should be borne in mind that the specified position of the magnet 16 is an approximate position.

Returning to FIG. 2, the ladder circuit 20 is an R-2R type of ladder circuit constituted by resistors R, 2R (the resistance value of the resistor 2R is 2 times that of the resistor R). More specifically, the output terminal of the ladder circuit 20 is connected to the control IC 22, and the plural resistors R and one resistor 2R are connected in series between the control IC 22 and ground. Further, the plural input terminals of the ladder circuit 20 are connected to the respective microcomputers 26, and through the resistors 2R, are connected respectively between the respective series connected resistors R, 2R.

In this case, the ladder circuit 20 converts the n-bit digital signal (the number n of digital signals) input from the n microcomputers 26 into a single analog signal (analog output signal), and outputs the same to the control IC 22. Moreover, in the ladder circuit 20, a new n-bit digital signal is delivered thereto at a constant period from the n microcomputers 26. Therefore, in the case that the piston 14 is moved, the one analog signal that the ladder circuit 20 outputs to the control IC 22 changes at a fixed period.

The control IC 22 comprises at least an AD converter 40 (second AD converter), a controller 42, and a communications unit 44. One analog output signal from the ladder circuit 20 is input to the AD converter 40 of the control IC 22. The AD converter 40 converts the analog output signal input thereto into an n-bit digital signal (digital output signal) at a fixed period, and outputs the same to the controller 42.

On the basis of the n-bit digital output signal input thereto, the controller 42 determines an approximate position of the piston 14 (magnet 16). The controller 42 includes a table as shown in FIG. 4, and on the basis of the n-bit digital signal input thereto, determines the approximate position of the piston 14 (magnet 16). In accordance therewith, the approximate position of the piston 14 (magnet 16) can be determined immediately.

More specifically, DA conversion is performed by the ladder circuit 20 on the n-bit digital signal that is delivered thereto at a fixed period from the n magnetic detectors 18, and the DA converted single analog output signal is input to the control IC 22. Therefore, since the control IC 22 can collectively acquire the signals from all of the magnetic detectors 18 in the form of one analog output signal, the control IC 22 is capable of rapidly detecting the position of the piston 14 (magnet 16), without the need to sequentially read out analog detection signals from all of the magnetic detectors 18.

Moreover, the controller 42 may calculate a movement velocity and/or a movement distance of the piston 14 (magnet 16) on the basis of the approximate position of the piston 14 (magnet 16) which is determined at a fixed period.

The communications unit 44 and the n microcomputers 26 are connected through a signal line 50. In the case that the approximate position of the piston 14 (magnet 16) has been determined, then on the basis of the determined approximate position of the piston 14 (magnet 16), the controller 42 specifies, through the signal line 50, a plurality of the magnetic detectors 18 to be used for reading out analog detection signals therefrom.

More specifically, as has been noted previously, due to the fact that the magnetism from the magnet 16 possesses a constant extent or spread, the position of the magnet 16 that is specified from the n-bit digital output signal is an approximate position. Thus, in order for the controller 42 to find and retrieve (detect) the zero-crossing point P for specifying the position in detail (detailed position) of the magnet 16, magnetic detectors 18 within a predetermined range from the determined approximate position of the piston 14 (magnet 16), or stated otherwise, magnetic detectors 18 up to a predetermined number of detectors on both sides respectively in the direction of the arrow a1 and the direction of the arrow a2 from the determined approximate position of the piston 14 are specified as magnetic detectors 18 to be used for reading out analog detection signals therefrom. Incidentally, the number of magnetic detectors 18 that are specified for the purpose of reading out the analog detection signals is considerably fewer than the number n of all of the magnetic detectors 18 arranged on the outer side of the cylinder tube 12.

In this case, the controller 42 (control IC 22), via the signal line 50, delivers control signals sequentially to the microcomputers 26 of the specified plurality of magnetic detectors 18. The microcomputers 26 of the magnetic detectors 18 that have received the control signals send analog detection signals detected by the Hall elements 24 to the control IC 22 (controller 42) through the signal line 50. In accordance with this feature, the controller 42 (control IC 22) is capable of acquiring sequentially, through the signal line 50, analog detection signals from the microcomputers 26 of the specified plurality of magnetic detectors 18.

Transmission of the analog detection signals through the aforementioned signal line 50 is performed through the communications units 34 and the communications unit 44 by way of serial communications between the microcomputers 26 and the control IC 22. In this case, such serial communications are carried out by an IIC (I2C) bus (IIC and I2C are registered trademarks), an SPI bus, or the like.

The controller 42 identifies the accurate location of the piston 14 (magnet 16) on the basis of the analog detection signals received from the plurality of magnetic detectors 18. More specifically, the controller 42 plots the values of the analog detection signals (voltage values) received from the plurality of magnetic detectors 18 with respect to the positions at which the magnetic detectors 18 are arranged, and thereby determines a waveform such as that shown in FIG. 5, and identifies the zero-crossing point P therein. In addition, the controller 42 specifies as the detailed position of the piston 14 (magnet 16) the position of the identified zero-crossing point P.

In this manner, since there is no need to sequentially acquire analog detection signals from all (n number) of the magnetic detectors 18, the detailed position of the piston 14 (magnet 16) can be specified quickly and accurately. Moreover, the controller 42 may calculate a movement velocity and/or a movement distance of the piston 14 (magnet 16) on the basis of the specified detailed position of the piston 14 (magnet 16).

Advantages and Effects of the Present Embodiment

As has been described above, with the position detecting device 11 according to the present embodiment, the ladder circuit 20 which functions as a DA converter, after having received as an n-bit digital signal the digital detection signals output respectively from the n magnetic detectors 18, performs DA conversion to convert the n-bit digital signal into one analog output signal, and outputs the same to the control IC 22. As a result, there is no need to sequentially read out the number n of analog detection signals or digital detection signals, and therefore, based only on the one analog output signal, the control IC 22 can rapidly detect the position of the piston 14 on which the magnet 16 is mounted.

Further, when the piston 14 comes into proximity to the number n of Hall elements 24, the Hall elements 24 react to (i.e., detect) the magnetism from the magnet 16 and output high level analog detection signals, whereas when the piston 14 becomes distanced therefrom and such magnetism cannot be detected, the Hall elements 24 output low level analog detection signals. Consequently, from the relationship between the value of the single analog output signal responsive to the n-bit digital signal (based on the n analog detection signals), and the positions at which the n Hall elements 24 are arranged, the control IC 22 can easily detect the approximate position of the magnet 16 (i.e., the approximate position of the piston 14 on which the magnet 16 is mounted).

Furthermore, since the control IC 22 reads out only the one analog output signal from the ladder circuit 20, the number of wirings between the control IC 22 and the ladder circuit 20 can be reduced. Accordingly, with the control IC 22, it is possible to detect the approximate position of the piston 14 with a minimum required amount of wirings. As a result, an increase in size and scale of the position detecting device 11 can be avoided, and costs can be reduced.

Consequently, according to the position detecting device 11 of the present embodiment, it is possible to improve responsiveness by rapidly detecting the approximate position of the piston 14 on which the magnet 16 is mounted, and a reduction in size and cost of the position detecting device 11 can be realized.

Further, the AD converter 40 of the control IC 22 performs AD conversion of the single analog output signal input thereto into the n-bit digital output signal, and the controller 42 specifies the approximate position of the magnet 16 on the basis of the n-bit digital output signal, whereby the position of the piston 14 on which the magnet 16 is mounted is detected. More specifically, the n-bit digital output signal is a digital signal that corresponds to the digital detection signals output to the ladder circuit 20 from the number n of magnetic detectors 18. Consequently, from the relationship between the value of the n-bit digital output signal and the positions at which the n Hall elements 24 are arranged (see FIG. 4), the controller 42 can easily detect the approximate position of the piston 14.

In the above description, a case has been explained in which the magnetic sensor elements that detect magnetism from the magnet 16 are Hall elements 24. However, in the present embodiment, the magnetic sensor elements are not limited to Hall elements 24, and insofar as magnetism is capable of being detected thereby, other types of magnetic sensor elements may be used. For example, instead of the Hall elements 24, the use of coils or MR sensors may be adopted.

Further, based on the approximate position of the piston 14 identified using the n-bit digital output signal, the controller 42 reads out values of the analog detection signals through the signal line 50 from the plurality of microcomputers 26 that lie within a predetermined range. More specifically, since there is no need for the controller 42 to read out the values of the analog detection signals from all of the microcomputers 26, the processing time required to identify the detailed position of the piston 14 can be shortened. Consequently, with the position detecting device 11 according to the present embodiment, the process to specify the detailed position of the piston 14 can be performed highly rapidly, and responsiveness can further be enhanced.

Figure 5:
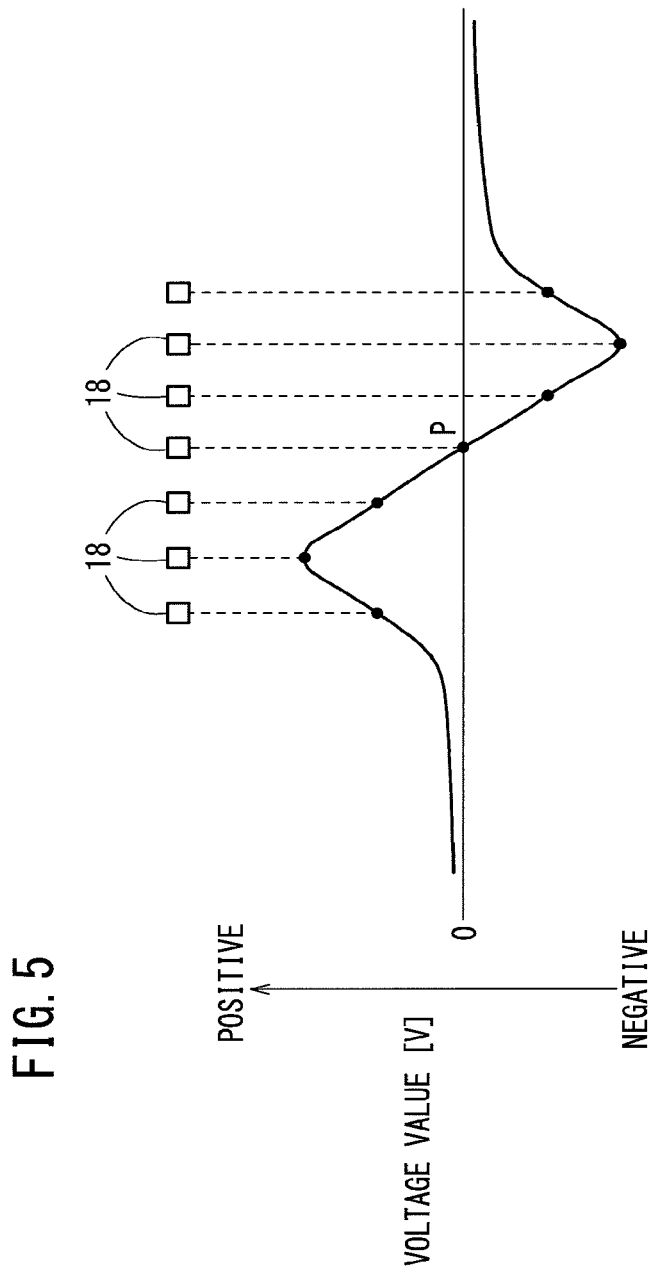
FIG. 5 is a view for the purpose of specifying a zero-crossing point from a waveform.

Further, the controller 42 plots the values of the plurality of analog detection signals that are read out from the specified plurality of microcomputers 26, with respect to the positions at which the specified plurality of magnetic detectors 18 are arranged, thereby determines the waveform of FIG. 5 showing a change of the values of the plurality of analog detection signals with respect to the directions of the arrow A, and further detects a zero-crossing point P where the determined waveform crosses a zero line, thereby identifying the position of the detected zero-crossing point P as the detailed position of the piston 14. In accordance with this feature, it is possible to specify the detailed position of the piston 14 quickly and reliably. Further, by identifying the detail position of the piston 14, a movement velocity and/or a movement distance of the piston 14 can also be calculated on the basis of the identified detailed position of the piston 14.

Additionally, in the position detecting device 11 according to the present embodiment, the magnet 16 is mounted on the piston 14 with the magnetic poles thereof oriented along the movement direction of the piston 14, and the n magnetic detectors 18 are disposed in a row along the movement direction on an outer side of the cylinder tube 12. In accordance with this feature, the position detecting device 11 can be applied to the actuator 10, and simply by arranging the n magnetic detectors 18 in a row on the outer side of the cylinder tube 12, the detailed position of the piston 14 on which the magnet 16 is mounted can be specified quickly and reliably.

Further, by arranging the n magnetic detectors 18 in a row on the outer side of the cylinder tube 12, widening in the widthwise direction (the outer peripheral direction of the cylinder tube 12) can be suppressed. As a result, the n magnetic detectors 18 can be mounted in a row on a printed circuit board having a rectangular shape elongated along the longitudinal direction (the directions of the arrow A) of the cylinder tube 12, and when the printed circuit board is disposed on the cylinder tube 12 (for example, when arranged by embedding the printed circuit board in a groove provided in the longitudinal direction of the cylinder tube 12), the number of wires of the printed circuit board can be reduced, together with realizing a reduction in the space occupied in the widthwise direction. Consequently, according to the present embodiment, in the case that the position detecting device 11 is applied to an actuator 10, in comparison with the conventional technique, an advantage is achieved in terms of the footprint (installation area) and cost thereof.

The present invention is not limited to the embodiment described above, and it is a matter of course that various modified or additional configurations could be adopted therein without departing from the scope of the invention as set forth in the appended claims.

What is claimed is:

1. A position detecting device comprising:
    a number n of magnetic detectors, each having a magnetic sensor element configured to detect magnetism from a magnet mounted on a moving body and output an analog detection signal responsive to the magnetism, and a first analog to digital (AD) converter configured to perform AD conversion of the analog detection signal into a digital detection signal and output the digital detection signal, the n magnetic detectors being disposed at regular intervals along a movement direction of the moving body;
    a digital to analog (DA) converter configured to receive, as an n-bit digital signal, the digital detection signals output respectively from the n magnetic detectors, perform DA conversion on the n-bit digital signal, and output a DA converted analog output signal;
    a position detecting unit configured to detect a position of the moving body based on the analog output signal input thereto from the DA converter; and
    a signal line configured to connect the n magnetic detectors and the position detecting unit;
    wherein the position detecting unit specifies a plurality of magnetic detectors that lie within a predetermined range with respect to the detected position of the moving body, wherein the plurality of magnetic detectors that lie within a predetermined range with respect to the detected position of the moving body is fewer than n, reads out values of a plurality of analog detection signals from the specified plurality of magnetic detectors through the signal line, and identifies a detailed position of the moving body based on the values of the plurality of analog detection signals that were read out.

2. The position detecting device according to claim 1, wherein the position detecting unit comprises a second AD converter configured to perform AD conversion on the analog output signal input thereto, and the position detecting unit specifies a position of the magnet based on an AD converted n-bit digital output signal, whereby the position of the moving body on which the magnet is mounted is detected.

3. The position detecting device according to claim 1, wherein the position detecting unit plots the values of the plurality of analog detection signals that are read out from the specified plurality of magnetic detectors, with respect to positions at which the specified plurality of magnetic detectors are arranged, thereby determining a waveform showing a change of the values of the plurality of analog detection signals with respect to the movement direction, and detects a zero-crossing point where the determined waveform crosses a zero line, thereby identifying a position of the detected zero-crossing point as the detailed position of the moving body.

4. The position detecting device according to claim 1, wherein the position detecting unit calculates a movement velocity and/or a movement distance of the moving body based on the identified detailed position of the moving body.

5. The position detecting device according to claim 1, wherein the DA converter comprises an R-2R type of ladder circuit.

6. The position detecting device according to claim 1, wherein:
    the n magnetic sensor elements are Hall elements;
    the moving body is a piston configured to move along the movement direction in an interior of a cylinder tube of an actuator;
    the magnet is mounted on the piston with magnetic poles thereof oriented along the movement direction; and
    the n magnetic detectors are disposed in a row along the movement direction on an outer side of the cylinder tube.

* * * * *